United States Patent
Banerjee et al.

(10) Patent No.: US 6,501,870 B1
(45) Date of Patent: Dec. 31, 2002

(54) SYSTEM AND METHOD FOR REDUCING EFFECTS OF OPTICAL IMPAIRMENTS IN OPTICALLY AMPLIFIED LIGHTWAVE COMMUNICATION SYSTEMS

(75) Inventors: Sonali Banerjee, Eatontown, NJ (US); Atul Kumar Srivastava, Eatontown, NJ (US); Yan Sun, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/518,301

(22) Filed: Mar. 3, 2000

(51) Int. Cl.[7] .............................. G02B 6/28; H04B 10/18
(52) U.S. Cl. .................. 385/24; 359/124; 359/161; 359/337; 359/337.4
(58) Field of Search ............................. 385/15, 24, 27, 385/39, 123; 359/124, 127, 161, 173, 333, 334, 337, 337.4, 341.1, 341.2

(56) References Cited

U.S. PATENT DOCUMENTS

| | | | |
|---|---|---|---|
| 5,187,610 A | 2/1993 | Habbab | 359/341 |
| 5,191,631 A * | 3/1993 | Rosenberg | 385/123 |
| 5,375,010 A * | 12/1994 | Zervas et al. | 359/341 |
| 5,561,552 A * | 10/1996 | Shibuya | 359/341 |
| RE35,697 E * | 12/1997 | Grasso et al. | 385/24 |
| 6,195,480 B1 * | 2/2001 | Kosaka et al. | 385/24 |
| 6,266,180 B1 * | 7/2001 | Inagaki et al. | 359/337 |
| 6,317,255 B1 * | 11/2001 | Fatehi et al. | 359/341.44 |

* cited by examiner

Primary Examiner—John D. Lee
(74) Attorney, Agent, or Firm—Gregory J. Murgia

(57) ABSTRACT

The effects of optical impairments on optical signal transmission are substantially reduced in a lightwave transmission system by positioning optical amplifiers and network elements in respective upstream-downstream combinations. By placing an optical amplifier at a position upstream from its corresponding network element, sufficient amplification can be provided by the optical amplifier to compensate for losses introduced by its corresponding network element. Advantageously, the corresponding downstream network element provides sufficient attenuation of the forward travelling lightwave signals so that power-dependent nonlinear effects in the optical fiber do not significantly distort the lightwave signals. Moreover, because of the downstream location of the network element in relation to its corresponding network element, the network element substantially suppresses backward travelling optical signal components such as those caused by Rayleigh backscattering, Stimulated Brillioun Scattering (SBS), and the like. As such, the network element prevents unwanted back reflections and back scattered signals from affecting operation of its corresponding optical amplifier.

13 Claims, 3 Drawing Sheets

SYSTEM AND METHOD FOR REDUCING EFFECTS OF OPTICAL IMPAIRMENTS IN OPTICALLY AMPLIFIED LIGHTWAVE COMMUNICATION SYSTEMS

FIELD OF THE INVENTION

This invention relates to the field of lightwave communication systems and, more particularly, to overcoming optical impairments in short haul lightwave communication systems employing optical amplifiers.

BACKGROUND OF THE INVENTION

To meet the increasing demands for more bandwidth and higher data rates, wavelength division multiplexing (WDM) is being used extensively in long haul optical transmission systems and is being contemplated for use in ,short haul applications, such as metropolitan area networks and the like. As is well known, WDM combines many optical channels of different wavelengths for simultaneous transmission as a composite optical signal in an optical fiber.

Optical amplifiers are commonly used in lightwave communication systems as in-line amplifiers for boosting signal levels to compensate for losses in a transmission path, as power amplifiers for increasing transmitter power, and as pre-amplifiers for boosting signal levels before receivers. In WDM systems, optical amplifiers are particularly useful because of their ability to amplify many optical channels simultaneously. Although rare earth-doped fiber optical amplifiers, e.g., erbium-doped fiber amplifiers, are commonly used in WDM systems, semiconductor optical amplifiers are being contemplated for use in WDM short haul applications like metropolitan area networks and so on. In particular, semiconductor optical amplifiers appear to be a viable alternative to the more costly erbium-doped fiber amplifiers. A typical short- haul WDM network includes a plurality of network elements interconnected by optical fiber. It is common to include optical amplifiers in the network elements in order to boost the lightwave signal power of signals traversing the optical fiber between network elements. However, the amount of amplification must be properly controlled because of optical impairments that are dependent upon signal power. In addition to affecting the transmission of optical signals, these optical impairments can also adversely affect the operation of optical components in the transmission path.

For example, Rayleigh backscattering is a well-known problem in which unwanted reflections are produced as an optical signal propagates through an optical fiber. In Rayleigh backscattering, the power level of the backscattered signals can be especially detrimental to the operation of optical amplifiers, such as semiconductor optical amplifiers, causing instabilities in operation, adding noise, and so on.

Non-linear effects can also cause problems in optical transmission. For example, Stimulated Brillioun Scattering (SBS) is a known phenomena which occurs when the power level of optical signals exceeds a certain threshold referred to as the SBS threshold. Briefly, SBS is a stimulated scattering process which converts a forward travelling optical signal into a backward travelling component of the optical signal which is also shifted in frequency. Among other problems, SBS results in increased backward coupling into optical components in the optical fiber path, which can affect operation of the components. For example, a backward travelling component can cause instabilities in optical amplifier operation. Other fiber non-linearities, e.g., four wave mixing, cross-phase modulation, self-phase modulation, Raman effect, and so on, are also well-known and can also be problematic in optical signal transmission. The network environment and topology are significant factors in determining when and to what extent the aforementioned problems will arise. Accordingly, proper design of a system is required in order to operate in the presence of such conditions. For example, long haul optical line systems typically have fiber spans of 80–120 kilometers between optical amplifiers without any intervening network elements. In these systems, optical isolators are typically employed to block unwanted back reflections of optical signals that would otherwise enter back through the output of the optical amplifiers. Moreover, the length of fiber spans serves to attenuate both forward propagating signals as well as backward travelling components, thereby reducing the occurrences of the aforementioned optical impairments.

By contrast, short haul optical systems, such as metropolitan area networks, have much shorter fiber spans. These short haul networks therefore cannot rely solely on the length of fiber spans to provide the necessary attenuation. Furthermore, these short haul networks typically have a higher density of network elements in a more geographically confined area, e.g., more closely-spaced optical amplifiers and network elements. Placing optical isolators at each network element location is very costly and highly undesirable in the cost-sensitive, short haul environment.

The challenges associated with operating optically amplified short haul networks in the presence of the aforementioned optical impairments are further complicated by the dynamic nature of short haul networks. For example, short haul WDM networks generally include a plurality of network elements capable of adding/dropping, routing, and cross-connecting optical signals. Losses introduced by these network elements can be significant. However, boosting gain of optical amplifiers to compensate for these losses can cause the system to be even more susceptible to the aforementioned optical impairments, e.g., exceeding SBS thresholds, causing higher intensity back reflections, and so on.

SUMMARY OF THE INVENTION

The effects of optical impairments on optical signal transmission in a lightwave transmission system are substantially reduced according to the principles of the invention by positioning optical amplifiers and network elements in respective upstream-downstream combinations. More specifically, by placing an optical amplifier at a position upstream from its corresponding network element, sufficient amplification can be provided by the optical amplifier to compensate for losses introduced by its corresponding network element. Advantageously, the corresponding downstream network element provides sufficient attenuation of the forward travelling lightwave signals so that power-dependent nonlinear effects in the optical fiber do not significantly distort the lightwave signals. Moreover, because of the downstream location of the network element in relation to its corresponding network element, the network element substantially suppresses backward travelling optical signal components such as those caused by Rayleigh backscattering, Stimulated Brillioun Scattering (SBS), and the like. As such, the network element prevents unwanted back reflections and back scattered signals from affecting operation of its corresponding optical amplifier.

Costs associated with installing and operating lightwave transmission systems are also substantially reduced according to the principles of the invention. In particular, costly optical isolator components are no longer needed at the output of every optical amplifier because the respective downstream network elements effectively perform an isolation function. Less expensive semiconductor optical amplifiers can also be used to further reduce system cost. These cost savings can be especially advantageous in the cost-sensitive short haul WDM network environment.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION OF THE INVENTION

Although the illustrative embodiments described herein are particularly well-suited for a short haul wavelength division multiplexed (WDM) network having a plurality of network elements, and shall be described in this exemplary context, those skilled in the art will understand from the teachings herein that the principles of the invention may also be employed in conjunction with other types of lightwave communication systems and networks. Accordingly, the embodiments shown and described herein are only meant to be illustrative and not limiting.

Figure 1:
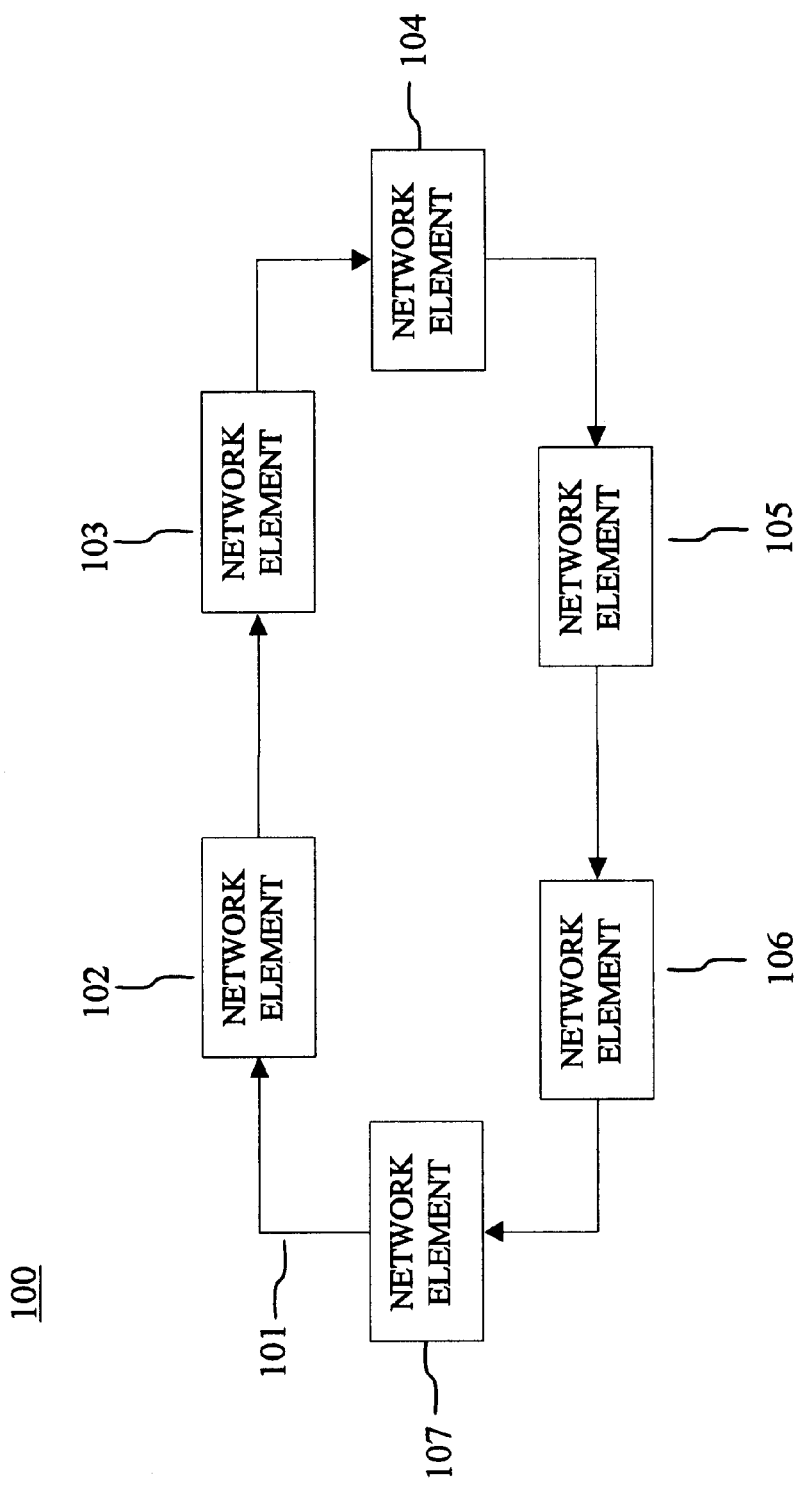
FIG. 1 is a simplified block diagram showing a short haul lightwave transmission system configured as an optical ring in which the principles of the invention may be practiced.

FIG. 1 shows a simplified ring network 100 comprising a plurality of network elements 102–107 interconnected by optical fiber 101. Ring network 100 could be used, for example, in short haul network environments such as metropolitan optical networks, local area networks, and so on. Ring network 100 can also support single wavelength optical communications or multi-wavelength optical communications employing WDM techniques. For simplicity of explanation, the embodiments of the invention will be described in the context of WDM transmission. As such, optical fiber 101 of ring network 100 carries a composite WDM optical signal comprising a plurality of individual optical channels of different wavelengths.

Figure 2:
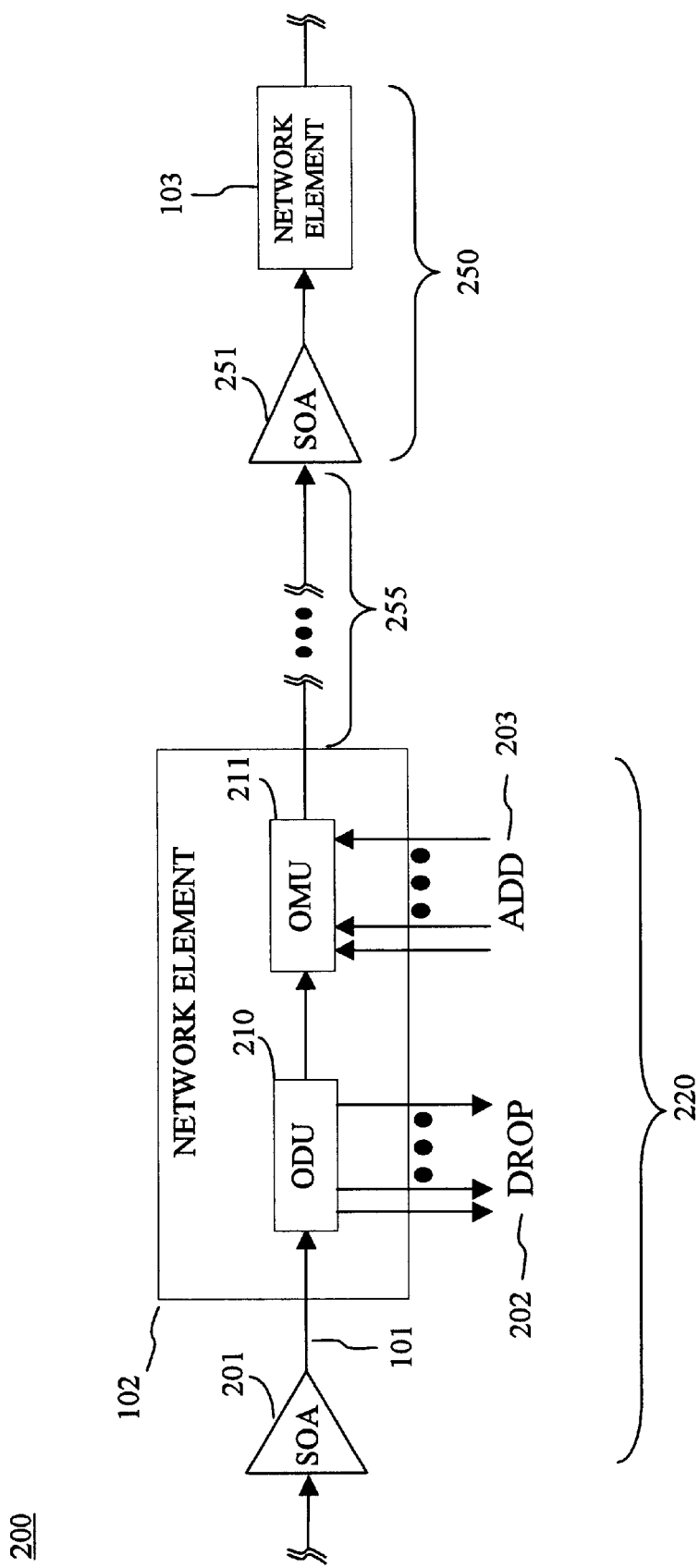
FIG. 2 is a simplified block diagram of one illustrative embodiment of the invention.

As is well-known, network elements 102–107 may be configured to perform one or more different functions such as, for example, adding and dropping optical signals, cross-connecting optical signals, and so on. Consequently, each of network elements 102–107 may not necessarily be equivalent in function or structure. As shown in FIG. 2, it is assumed for purposes of describing the embodiments of the invention that network element 102 has the functionality of an optical add/drop device capable of adding and dropping individual optical channels from a composite WDM signal.

FIG. 2 illustrates the principles of the invention in one exemplary embodiment. In particular, FIG. 2 illustrates the upstream-downstream combination of optical amplifiers and network elements in lightwave communication system 200. More specifically, the first upstream-downstream combination 220 includes optical amplifier 201 and network element 102 and the second combination 250 includes optical amplifier 251 and network element 103. For simplicity of illustration and explanation, only two combinations are shown in FIG. 2, however, any number of combinations may be utilized. Optical fiber 255 represents the span length between the output of network element 102 and the input of optical amplifier 251. In a short haul metropolitan optical network, for example, the span length could be on the order of approximately 5–20 kilometers.

As shown, optical amplifier 201 is coupled along optical fiber 101 at a location upstream from network element 102. Optical amplifier 201 can be any type of optical amplifier including, but not limited to rare earth-doped fiber optical amplifiers, such as erbium-doped fiber amplifiers, semiconductor optical amplifiers, and so on. The embodiments shown and described herein will refer to semiconductor optical amplifiers to illustrate another aspect of the invention, i.e., a low cost solution for short haul lightwave communication systems. The operation of optical amplifiers, including semiconductor optical amplifiers, is well-known and will not be described in detail herein.

As shown in FIG. 2, network element 102 receives an amplified input WDM signal, drops one or more selected optical channels 202 via optical demultiplexer unit 210, adds one or more selected optical channels 203 via optical multiplexer unit 211 and transmits an output WDM signal in a downstream direction for the next network element 103 in the system. Various well-known devices can be used for optical demultiplexer unit 210 and optical multiplexer unit 211 such as, for example, waveguide grating routers, thin film filters, fiber Bragg gratings in conjunction with optical circulators or directional couplers, and so on. As such, the detailed structure and operation of optical demultiplexer unit 210 and optical multiplexer unit 211 will not be described in detail herein.

Regardless of whether network element 102 is an add/drop node as depicted in FIG. 2 or any other type of network element, e.g., cross-connect, it will be appreciated by those skilled in the art that network elements of any type typically introduce losses to the optical signals being processed therethrough. For example, these losses may be insertion losses from optical demultiplexer unit 210 and optical multiplexer unit 211 as well as signal losses associated with the adding and dropping of channels, and so on. As will be described in more detail below, losses introduced by network element 102 are utilized in an advantageous manner according to the principles of the invention.

Using prior arrangements for comparison, an optical amplifier is typically used to boost the optical signal power being output from a network element to compensate for losses introduced by the network element as well as to compensate for losses that are expected in the optical fiber path between network elements. As previously described, these schemes fall short in at least two respects. First, optical isolators are typically required at the output of each optical amplifier to prevent unwanted back reflections and back scattered signals from adversely affecting operation of the optical amplifiers. Given the density of network elements and optical amplifiers in a short haul network, optical isolators can raise system costs considerably. Second, the amount of output power launched into the optical fiber from the optical amplifier must be carefully controlled in order to avoid the aforementioned problems such as SBS, fiber non-linearities, and so on.

By contrast, a system according to the principles of the invention overcomes these limitations. As shown and described herein, placing semiconductor optical amplifier 201 at a location upstream from network element 102 has several benefits. First, the amount of gain and output power provided by semiconductor optical amplifier 201 can be selected to compensate for the loss that will be subsequently contributed by its corresponding downstream network element 102 as well as the loss expected in the fiber span between network element 102 and optical amplifier 251. Consequently, the amount of gain and output power provided by semiconductor optical amplifier 201 is a matter of design choice in view of considerations such as the amount of loss contributed by network element 102, the span length of optical fiber between network element 102 and semiconductor optical amplifier 251, and the operating parameters of semiconductor optical amplifier 201. Obviously, less lossy network elements could offset longer span lengths and visa versa.

Second, the loss introduced by network element 102 will ensure that the power levels of the amplified signals propagating forward do not exceed thresholds associated with the aforementioned fiber non-linearities. More specifically, the power of optical signals launched into optical fiber 255 will be reduced so that the aforementioned thresholds are not exceeded and so that the adverse effects associated with the fiber non-linearities are not triggered. In prior arrangements, this is typically accomplished using separate power control schemes, dithering signals, or attenuating output power, each of which adds cost (e.g., more components) and complexity to the system.

Third, any unwanted back reflections (e.g., from Rayleigh backscattering, SBS, and so on) will be substantially suppressed, e.g., effectively blocked, by network element 102 prior to entering back into semiconductor optical amplifier 201.

So, in operation, the fiber span losses of system 200, the network element losses, operating parameters of optical amplifiers 201 and 251, thresholds for non-linear effects (e.g., SBS), and so on would be known design variables. Using this data, optical amplifier gain and output power of optical amplifier 201 can then be selected accordingly to compensate adequately (e.g., maintain an acceptable optical signal to noise ratio, etc.) for: 1) the fiber span loss up to the next upstream-downstream combination 250, 2) the loss introduced by network element 102, 3) the thresholds associated with non-linear effects (e.g., SBS threshold), and so on. Determination of the SBS threshold itself will depend on several factors including, but not limited to, type of optical fiber being used. Accordingly, the gain of optical amplifier 201 is a matter of design choice in view of the above factors.

The signal launched from optical amplifier 201 into optical fiber 101 will have relatively high power based on the selected gain and output power of optical amplifier 201. Network element 102 receives this signal and introduces losses as previously described. As such, the signal now launched from network element 102 into optical fiber 255 is attenuated by network element 102 (e.g., reduced in magnitude to have a lower power level) and then further attenuated along optical fiber 255 so that is lower than the SBS thresholds and the like. However, the gain and output power is selected so that the optical signals still have enough power to arrive at optical amplifier 251 with sufficient optical signal to noise ratio and so on. Any back reflected optical signals, whether from Rayleigh back scattering, SBS, or otherwise, will be substantially suppressed (e.g., blocked) by network element 102. As such, the operation of optical amplifier 201 will not be adversely affected by these back reflections.

The following example describes an experiment performed to demonstrate the principles of the invention described above. In general, parameters were selected to be representative of a metropolitan area network. However, it should be noted that the various arrangements, devices, materials, dimensions, parameters, operating conditions, etc., are provided by way of illustration only and are not intended to limit the scope of the invention.

EXAMPLE

Figure 3:
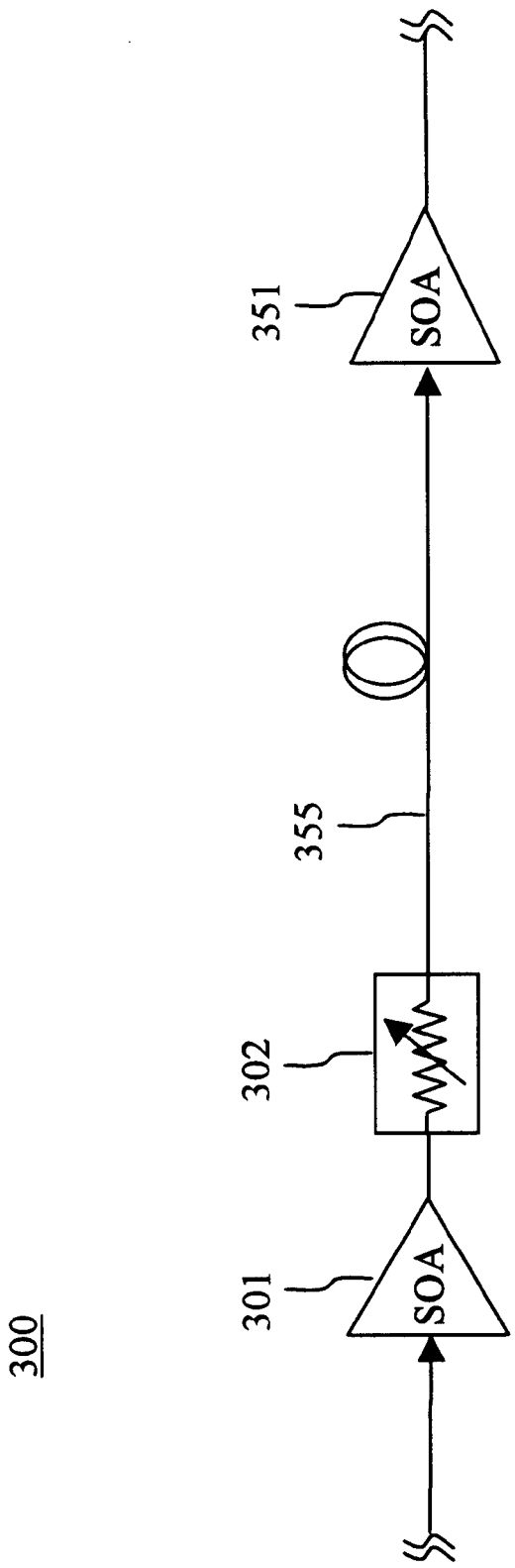
FIG. 3 is a simplified block diagram of an exemplary system configuration used to verify the principles of the invention.

More specifically, FIG. 3 shows an experimental system configuration for confirming the principles of the invention. In this exemplary configuration and experiment, system 300 includes a first semiconductor optical amplifier 301, a variable attenuator element 302 for simulating a network element, and a second semiconductor optical amplifier 351. As shown, optical fiber span 355 couples an output of variable attenuator element 302 to an input of semiconductor optical amplifier 351. For purposes of this experiment, semiconductor optical amplifiers 301 and 351 comprised commercially available, single stage, non-gain clamped amplifiers and optical fiber span 355 comprised commercially available single mode fiber, such as AllWave™ transmission fiber from Lucent Technologies.

In the configuration shown in FIG. 3, optical fiber span 355 had a span length of approximately 42 kilometers. Therefore, at approximately 0.2 dB loss per kilometer, the total loss of optical fiber 355 was approximately between 8 dB to 9 dB. Variable attenuator element 302 was used to simulate the loss introduced by a network element of approximately between 6 dB to 7 dB. For satisfactory operation of system 300, the input power to semiconductor optical amplifier 301 was approximately −3 dBm and the gain was set at approximately 15 dB (e.g., approximately 5 dB below the small-signal gain). As such, the output power launched from semiconductor optical amplifier 301 was approximately 12 dBm. After accounting for loss introduced by network element 302, the signal power launched into optical fiber 355 was approximately 5 dB to 6 dB, which is well below the typical SBS thresholds for single mode optical fibers. As is well-known, the SBS threshold is typically the lowest of all the thresholds associated with optical impairments. After accounting for loss introduced by optical fiber span 355, the signal power at the input of semiconductor optical amplifier 351 was approximately −3 dBm.

So, by utilizing the upstream-downstream combination of optical amplifier 301 and network element 302 according to the principles of the invention, the output power launched into optical fiber span 355 was maintained below the thresholds for triggering the aforementioned non-linear effects and unwanted back reflections were effectively blocked by network element 302 from entering back into optical amplifier 301.

Accordingly, a system designed and operated according to the principles of the invention does not require expensive optical isolators to protect against back reflections and back scattering. The use of semiconductor optical amplifiers further reduces system costs as compared to doped fiber amplifiers. More specifically, the unique upstream-downstream combination of semiconductor optical amplifiers and network elements utilizes the passive loss characteristics of the network elements instead of using separate optical components to introduce post-amplification loss. As such, the principles of the invention can be applied with the existing system architecture.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the illustrative embodiments were described in the context of WDM ring networks utilizing semiconductors optical amplifiers, the principles of the invention may be employed with any type of lightwave transmission system that would benefit from a system architecture in which costly components can either be removed or replaced with less costly components, thereby reducing overall system costs. Accordingly, the invention is only limited by the claims that follow.

What is claimed:

1. An optically amplified lightwave transmission system including a plurality of network elements and a plurality of optical amplifiers Interconnected by lightwave transmission media in a concatenated fashion, the system CHARACTERIZED BY:

each of the plurality of optical amplifiers and each of the plurality of network elements being coupled in respective upstream-downstream combinations such that an optical amplifier is co-located with and upstream from a corresponding network element, wherein an optical amplifier is operable to introduce gain to compensate for signal loss in downstream optical signal transmission, at least a part of the signal loss being contributed by the corresponding network element, wherein a network element located downstream from its corresponding optical amplifier introduces post-amplification loss to substantially reduce effects of power-dependent optical impairments in downstream optical signal transmission, and wherein each of the plurality of network elements is selected from the group consisting of add/drop devices and cross-connect devices.

2. The system according to claim 1, wherein a network element, at a position downstream from its corresponding optical amplifier, substantially suppresses optical signal components travelling in an upstream direction towards its corresponding optical amplifier.

3. The system according to claim 2, wherein the upstream travelling optical signal components include unwanted back reflections associated with Rayleigh backscattering.

4. The system according to claim 2, wherein the upstream travelling optical signal components include backward travelling optical signal components associated with Stimulated Brilliouin Scattering.

5. The system according to claim 1, wherein the lightwave transmission system is a wavelength division multiplexed (WDM) system and wherein the plurality of optical amplifiers are selected from the group consisting of semiconductor optical amplifiers and doped fiber amplifiers.

6. The system according to claim 5, wherein the WDM system is part of an optical network selected from the group consisting of metropolitan area networks, local area networks, metropolitan access ring networks, and metropolitan inter-office ring networks.

7. The system according to claim 5, wherein the WDM system is a short haul system having an optical fiber span length of approximately 5–20 kilometers between interconnected network elements.

8. An optically amplified lightwave communication system comprising:

one or more optical amplifiers for boosting optical signal power to compensate for signal loss in forward signal transmission; and one or more network elements, each co-located with and coupled at a position downstream from a corresponding one of the one or more optical amplifiers, wherein loss introduced by a network element substantially reduces effects of power-dependent optical impairments associated with forward signal transmission and wherein a network element, at a position downstream from its corresponding co-located optical amplifier, is capable of substantially suppressing backward travelling optical signal components, and wherein each of the plurality of network elements is selected from the group consisting of add/drop devices and cross-connect devices.

9. The system according to claim 8, wherein the backward travelling optical signal components include unwanted back reflections associated with Rayleigh backscattering.

10. The system according to claim 8, wherein the backward travelling optical signal components are caused by Stimulated Brilliouin Scattering.

11. The system according to claim 8, wherein the optically amplified lightwave communication system is a wavelength division multiplexed (WDM) system and wherein the one or more optical amplifiers are selected from the group consisting of semiconductor optical amplifiers and doped fiber amplifiers.

12. An optically amplified lightwave communication system comprising:

one or more optical amplifiers and one or more network elements coupled in respective, co-located upstream-downstream combinations such that an optical amplifier co-located with and upstream from its corresponding network element introduces gain to compensate for signal loss in forward signal transmission, wherein at least a part of the signal loss is contributed by the network element in the respective upstream-downstream combination, and such that a network element located downstream from its corresponding optical amplifier introduces post-amplification loss to substantially reduce effects of power-dependent optical impairments in forward signal transmission, wherein each of the network elements is selected from the group consisting of add/drop devises and cross-connect devices.

13. The system according to claim 12, wherein a network element, at a position downstream from its corresponding upstream optical amplifier, substantially suppresses backward travelling optical signal components.

* * * * *